United States Patent [19]

Hashimoto et al.

[11] Patent Number: 5,758,009
[45] Date of Patent: May 26, 1998

[54] VIDEO RECORDING CONTROL DEVICE

[75] Inventors: Seiji Hashimoto; Michihiro Fujiyama, both of Daito; Toshiaki Kawasaki, Shijonawate, all of Japan

[73] Assignee: Sanyo Electric Co., Ltd., Osaka, Japan

[21] Appl. No.: 668,738

[22] Filed: Jun. 24, 1996

[30] Foreign Application Priority Data

Jun. 30, 1995 [JP] Japan ............... 7-165863
Jan. 31, 1996 [JP] Japan ............... 8-015722

[51] Int. Cl.⁶ ................................ H04N 5/76
[52] U.S. Cl. ........................... 386/83; 386/46
[58] Field of Search .................. 386/46, 83, 95, 386/81, 82; 348/906, 468; H04N 5/76

[56] References Cited

U.S. PATENT DOCUMENTS 4,864,429  9/1989  Eigeldinger et al. ............ 386/95
5,488,409  1/1996  Yuen et al. ..................... 386/83
5,541,738  7/1996  Mankovitz ...................... 386/83

*Primary Examiner*—Thai Tran
*Assistant Examiner*—Huy Nguyen
*Attorney, Agent, or Firm*—Loeb & Loeb LLP

[57] ABSTRACT

A video recording control device compares current and previous values indicated by an elapsed broadcast time information (TIS) of a program in an EDS (Extended Data Service) signal superimposed on a received television signal during its vertical blanking period, and controls the recording operation of a video recording apparatus employing the television signal according to the result of comparison. Therefore, the ending time of the program being recorded can be detected by utilizing the TIS of the EDS signal, and thus, even when the broadcast time of the program is extended without notifying in advance, the recording can be continued accordingly.

9 Claims, 6 Drawing Sheets

1

VIDEO RECORDING CONTROL DEVICE

BACKGROUND OF THE INVENTION

1. Field of the Invention

The present invention relates to a video recording control device for use with a video tape recorder (hereinafter abbreviated as VTR) for performing preferable automatic recording control, and particularly to a video recording control device for performing automatic recording control according to an elapsed broadcast time information included in an EDS (Extended Data Service) signal superimposed on a television signal during a vertical blanking period.

2. Description of the Background Art

In an ordinary unattended video recording, the user sets the starting time and the finishing time of the recording to be memorized by the VTR in advance, such that initiation and termination of the recording would be controlled automatically according to a built-in clock. Therefore, if there is a change of starting or ending time in the broadcast program, the beginning or the ending of the program may not be recorded, and sometimes even an absolutely different program would be recorded instead. Particularly when changes are frequently made to the broadcast time of programs, unattended video recording by the built-in clock may not be practical.

In Germany, a system called VPS (Video Program System) has been adopted for accurate recording reservation of the VTR in order to avoid such a problem. In this system, a television signal is broadcast with recording control information (identification signal) superimposed thereon within a specified horizontal scanning period of vertical blanking period. A circuit for decoding it is incorporated into the VTR for making reservation of program recording.

Recently in the U.S.A., a certain broadcasting station has started a new service in which a signal called EDS is superimposed on the television signal within its vertical blanking period. Although EDS signal includes the time data, broadcasting station (channel) information, elapsed program broadcast time information (herein after referred to as TIS, which is an abbreviation for Time in Show), and program broadcast time length information (hereinafter referred to as LEN, which is an abbreviation for Length), it does not include program identification data for enabling detection of extended broadcast time like the VPS signal, and thus a reserved program recording like the one provided by the VPS has been impossible.

SUMMARY OF THE INVENTION

The object of the present invention is to provide a video recording control device in which an automatic control of recording by use of an EDS signal is possible.

In order to achieve the above object, a video recording control device according to the present invention performs a comparison between the current and previous values indicated in an elapsed program broadcast time information in an EDS signal superimposed on a television signal during its vertical blanking period, and controls the recording operation of a video recording apparatus employing the television signal according the result of comparison. By performing an automatic recording control using such video recording control device, it is made possible to detect the ending time of the program being recorded by utilizing the elapsed program broadcast time information of the EDS signal, such that even when the broadcast time of that program is extended without notifying in advance, the recording can be continued according to the extended time period.

2

In addition, the above-described video recording control device can decode a broadcast time length information and the elapsed broadcast time information of a program in the EDS signal, calculate the time left for broadcasting the program according to the values indicated by both of the decoded information, and when the time for starting the recording operation is set within a predetermined time left for broadcasting, continue the recording operation to a predetermined point of time. Accordingly, even when an instruction to start the recording operation of a program intended by the user to be recorded is provided before the broadcasting of that program is started, the program desired by the user can be recorded without causing inconvenience.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, description will be made in detail for the first to third embodiments of the present invention, with reference to the drawings.

Figure 1:
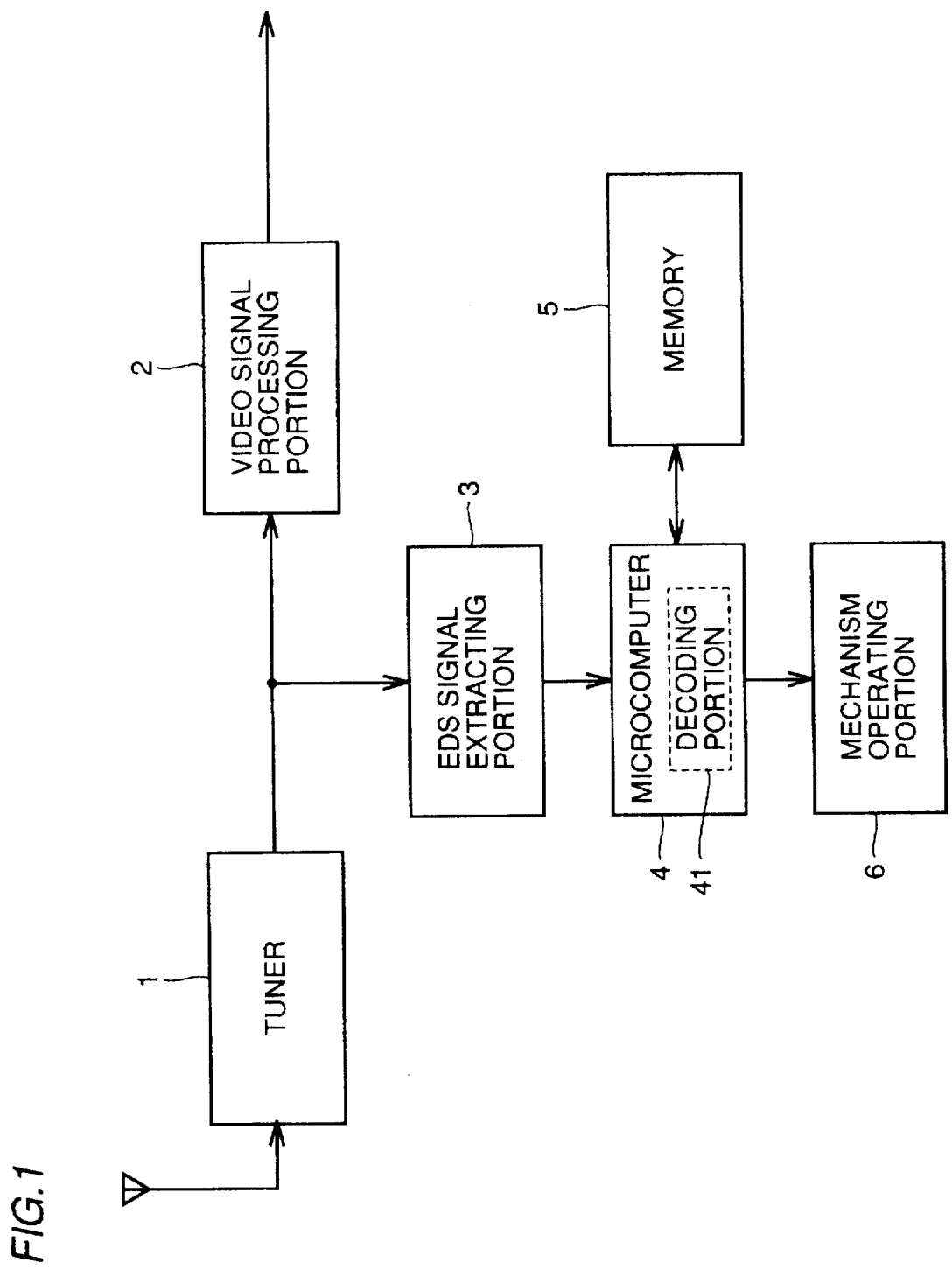
FIG. 1 is a block diagram showing the principal portions of a VTR with a video recording control device according to a first embodiment of the present invention.

Referring to FIG. 1, the VTR includes a tuner 1 for selecting a signal of a desired channel from television signals received at an antenna, a video signal processing portion 2 for processing the signal selected at tuner 1, an EDS signal extracting portion 3 for extracting an EDS signal from the signal applied via tuner 1, a microcomputer 4 for receiving the EDS signal extracted by EDS signal extracting portion 3 to withdraw and decode signals of TIS and LEN therein and then performing the process described later and other controls, a memory 5 in which TIS and LEN are temporarily stored, and a mechanism operating portion 6 controlled by microcomputer 4 for operating a mechanism for recording the television signal input via microcomputer 4 to a record medium. Although mechanism operating portion 6 can be controlled by microcomputer 4 to perform a video playing operation as well, description thereof will not be provided here.

Figure 2:
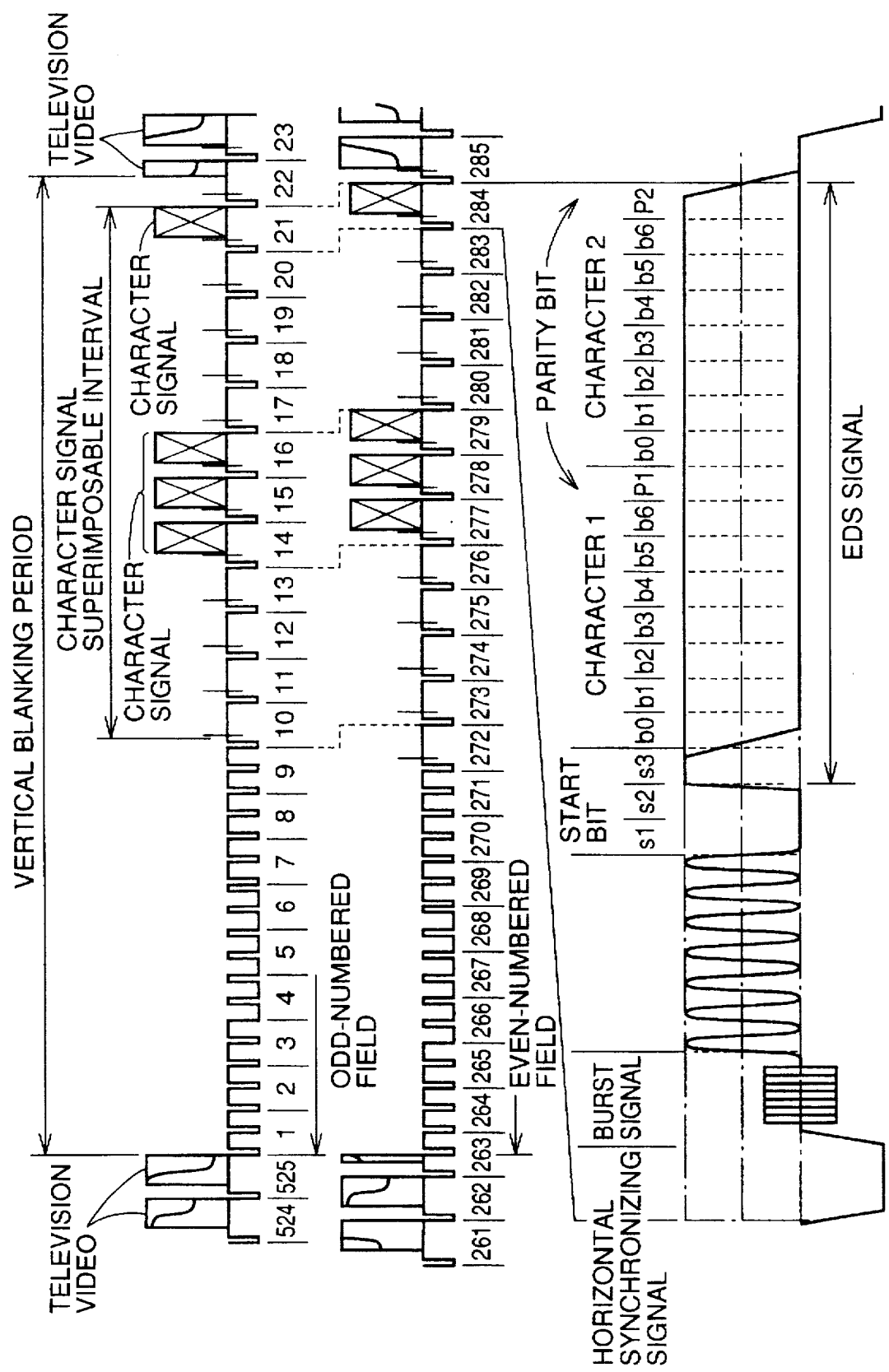
FIG. 2 illustrates an EDS signal superimposed on a television signal applied for first to third embodiments according to the present invention.

As described above, various types of information can be transmitted using the EDS signal. As shown in FIG. 2, the EDS signal is superimposed on the twenty-first horizontal synchronizing signal within the vertical blanking period of each even-numbered field of the television signal, and consists of 17 bits including a start bit s3, for one even-numbered field. Accordingly, the data portion of the EDS signal is of 2 bytes, with one character code allocated per byte and each byte including parity bits p1 and p2.

The EDS signal forms a packet consisting of a control code (1 byte), a type code (1 byte), a specified information, a dummy byte, a termination code (0F) and a check sum. Two codes, namely the control code and the type code, indicate the kind of information transmitted with that EDS signal. For example, when the information transmitted is a time data, the control code would be 07 while the type code being 01. When a broadcasting station (channel) information is transmitted, the control code is 05 and the type code is 02.

The time data transmitted by the EDS signal is, for example, formed of 10 bytes in total (i.e., the amount of 5 even-numbered fields=5 frames), and is repeatedly transmitted with the EDS signal.

(07, 01)-(minute, hour)-(day, month)-(day of week, year) -(0F, any code)

In the time data transmitted with the EDS signal, the sixth bit (b5) of the "month" data is provided as a second reset flag (a "Z" bit) for indicating that the second of that time is exactly zero.

EDS signal extracting portion 3 shown in FIG. 1 uses a slicer to extract only the EDS signal which is superimposed on the twenty-first horizontal synchronizing signal within the vertical blanking period of the television signal, and applies the extracted EDS signal to microcomputer 4. When microcomputer 4 detects the class code and the type code in the EDS signal applied from EDS signal extracting portion 3, it determines that an EDS signal is received, and uses a decoding portion 41 to analyze (decode) the EDS signal with a program according to a standard (EIA-608) relating to the EDS signal. Microcomputer 4 analyzes the data received successively after the reception of the class code (01) and the type code (02) using decoding portion 41. As a result of analysis, if an information on elapsed program broadcast time exists in that received data, microcomputer 4 determines that TIS is present and stores this TIS in memory 5. An analysis on LEN is carried on in a similar manner, and if LEN exists, it is stored in memory 5.

Description will now be made for the automatic recording operation according to the first embodiment of the present invention with reference to the steps S1 to S8 in the flow chart for the automatic recording operation in FIG. 3.

Here, microcomputer 4 urges mechanism operating portion 6 to start recording when a timer recording reservation set time is reached (S1). When recording is started, microcomputer 4 resets (i.e., set at zero) a TIS present flag which indicates whether there is TIS in the television signal or not by either 1 (set) or 0 (reset) (S2). Thereafter, microcomputer 4 monitors if there is TIS in the television signal (S3). When microcomputer 4 determines that TIS is not present (NO at S3), it determines whether the TIS present flag is "1" (S6). Here, if microcomputer 4 determines that TIS present flag is not "1" (NO at S6),it determines that TIS is not included in the television signal and carries on an operation similar to what is performed in an ordinary timer recording mode. More particularly, microcomputer 4 provides recording instruction to the mechanism operating portion 6 while determining whether the current time is past the preset recording termination time (S7) so as to decide whether the recording termination time is reached, and if it is decided that it is, urges mechanism operating portion 6 to stop the recording (S8).

Meanwhile, when microcomputer 4 determines that TIS is present in the television signal (YES at S3), it sets the TIS present flag (to "1") (S4). Thereafter, microcomputer 4 determines whether the value of TIS currently obtained is larger than the previous value of TIS (S5). At this time, microcomputer 4 returns to step S3 if it sees that the value of TIS currently obtained is larger than the previous TIS value (YES at S5), determining that the broadcasting of the program by the television signal being recorded is still continued, while urging mechanism operating portion 6 to stop the recording if it sees that the currently obtained TIS value is smaller than the previous TIS value (NO at S5) (S8).

Specific description will now be made for the control of recording operation based on the value of TIS described above. The value of TIS increases in accordance with the progress of the program by the television signal. For a program of 30 minutes in length, for example, the value of TIS at the time when the program has started is indicated as 0:00. When the program has progressed for 5 minutes, the value of TIS is 0:05, and after a progress of 29 minutes, the value is 0:29. If the program is not extended, the value of TIS at the time when this program has ended would be 0:30 which is the maximum value for this program. Since the value of TIS from there on is indicated as TIS value for another program which is broadcast next, the result of comparison between the TIS value when the next program is started and the TIS value when the previous program has ended would be such that the current TIS value (i.e., the value at the point of time when the next program is started) is smaller than the previous TIS value (i.e., the value at the point of time when the previous program has been ended) so that it is determined that the program being broadcast has been changed, and timer recording is terminated.

Meanwhile, when the broadcast time of the preceding program is extended, the current TIS value would be larger than the previous TIS value (for example, the value obtained one minute ago), and thus recording is continued. As a result, even when the time period of broadcasting a program is extended, as may be in the case of broadcasting a baseball game, the recording is carried on for the time added, and discontinuity of the recording is prevented. More specifically, for a program of 30 minutes long, the value of TIS is indicated as 0:00 when the broadcasting of the program is started. When the program has progressed for 29 minutes, the TIS value is 0:29. Here, if broadcasting of this program is extended to one hour, the indicated TIS value would be 0:40 and not 0:00 when 40 minutes has passed after the start of the program. Accordingly, the recording operation for this program is not terminated. When one hour has passed after the start of the program, broadcasting of the program is finished and broadcasting of the next program is started, the indicated value of TIS would change from 1:00 to 0:00. Thus, recording can be terminated at the point of time when the TIS value has been decreased (that is, when the program is changed).

Figure 3:
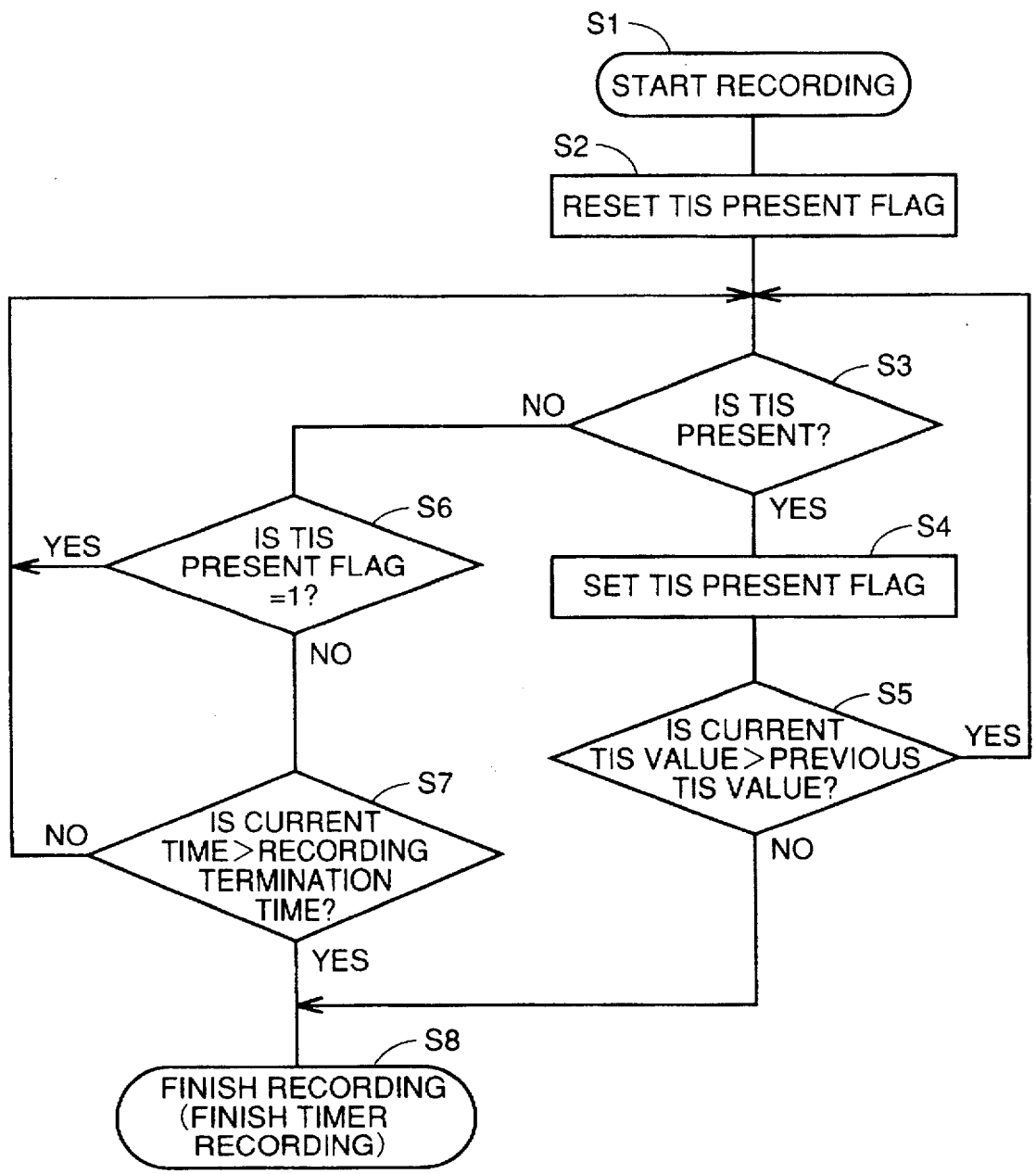
FIG. 3 is a flow chart for an automatic recording operation according to the first embodiment of the present invention.

In the case where the process flow returns from S5 to S3 in FIG. 3 and determination is made at step S3 that TIS is not present so as to proceed to step S6, TIS present flag is already set at step 4 and thus it is still determined that TIS present flag=1 so that process is returned to step S3.

Although the above description has dealt with the case in which the timer recording reservation set termination time has been reached, a quick start recording (QSR) in which the user may press the recording button while in automatic recording control mode and terminate the recording by the control of the TIS value is also possible.

The second embodiment of the present invention will now be described in the following, with reference to FIGS. 4 and 5.

Figure 4:
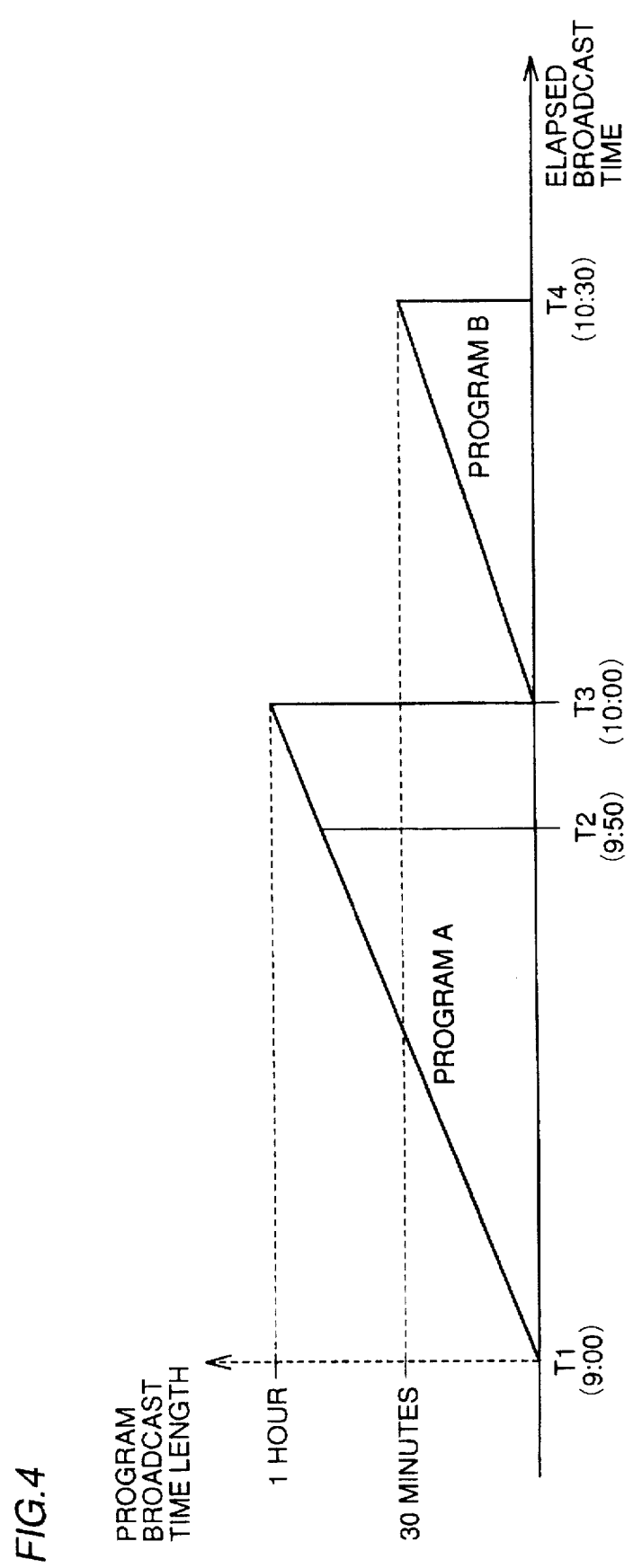
FIG. 4 is a time chart illustrating the relationship between the value of TIS and the program broadcast time length according to the second and third embodiments of the present invention.

FIG. 4 is a time chart for illustrating the relationship between the value of TIS and the program broadcast time length, with axis of ordinates showing the program broadcast time length and axis of abscissas showing elapsed broadcast time. Time T1 to time T3 indicate the time zone in which a program A is broadcast and time T3 to time T4 indicate the time zone in which a program B is broadcast, respectively. In FIG. 4, it is assumed that elapsed time T2 is the time when 50 minutes has passed after the time when program A was started (T1), program A is a one hour program and program B is a 30 minute program. For the sake of convenience for the description, it is assumed that elapsed time T1 is 9:00, elapsed time T3 is 10:00 and elapsed time T4 is 10:30.

Referring to FIG. 4, if a user intends to record program B and has set timer recording or the automatic recording by the quick start recording (QSR) to start considerably earlier than the beginning of program B, for example, at the time when 55 minutes has passed after the start of broadcasting program A, the monitoring of increase and decrease in the TIS value is started from that point in the case of the first embodiment and recording would be terminated automatically at time T3, suffering the disadvantage that the desired program B is not recorded. The second embodiment aims to solve such disadvantage.

The recording operation according to the second embodiment will now be described with reference to steps S11 to S16 in the flow chart of FIG. 5. First, when the recording is started (S11), a microcomputer 4 determines whether there is a TIS in the television signal at this point of time (S12). If there is no TIS (NO at S12), it performs an ordinary timer recording (i.e., recording without the control by TIS) (S15), and thereafter, recording is terminated in a manner according to this ordinary timer recording (S16).

Meanwhile, if there is TIS in the television signal (YES at S12), microcomputer 4 performs a subtraction between the program broadcast time length (the value of LEN) and elapsed broadcast time (the value of TIS) so as to obtain the time left for the broadcasting (S13), and if the subtracted value (time left for broadcasting) is 10 minutes or shorter (i.e., within an interval between time T2 and time T3 in FIG. 4) (YES at S13), an ordinary timer recording is performed (S15). More particularly, when recording by QSR is started at time 9:55 of FIG. 4, recording control by TIS is not performed, and the recording is terminated when the prescribed time period set by QSR has expired. It should be understood that QSR is a mode in which one press on the recording button leads to a transition to the recording mode, and one more press would make the recording last until it is either 0 minute or 30 minute closer to the present time. For example, if the button is pressed twice at 10:15, recording is performed until 10:30. If it is pressed once again, the recording is continued until 11:00. Fine control of the recording time in the range of ±1 minute is provided by the up-down key for the channel, for example.

According to the second embodiment described above, even when it is intended that program B should be recorded but the recording is started within a prescribed period before the beginning of program B, undesired termination of the recording at the time when program A is finished owing to the recording control by the TIS value is prevented.

Figure 5:
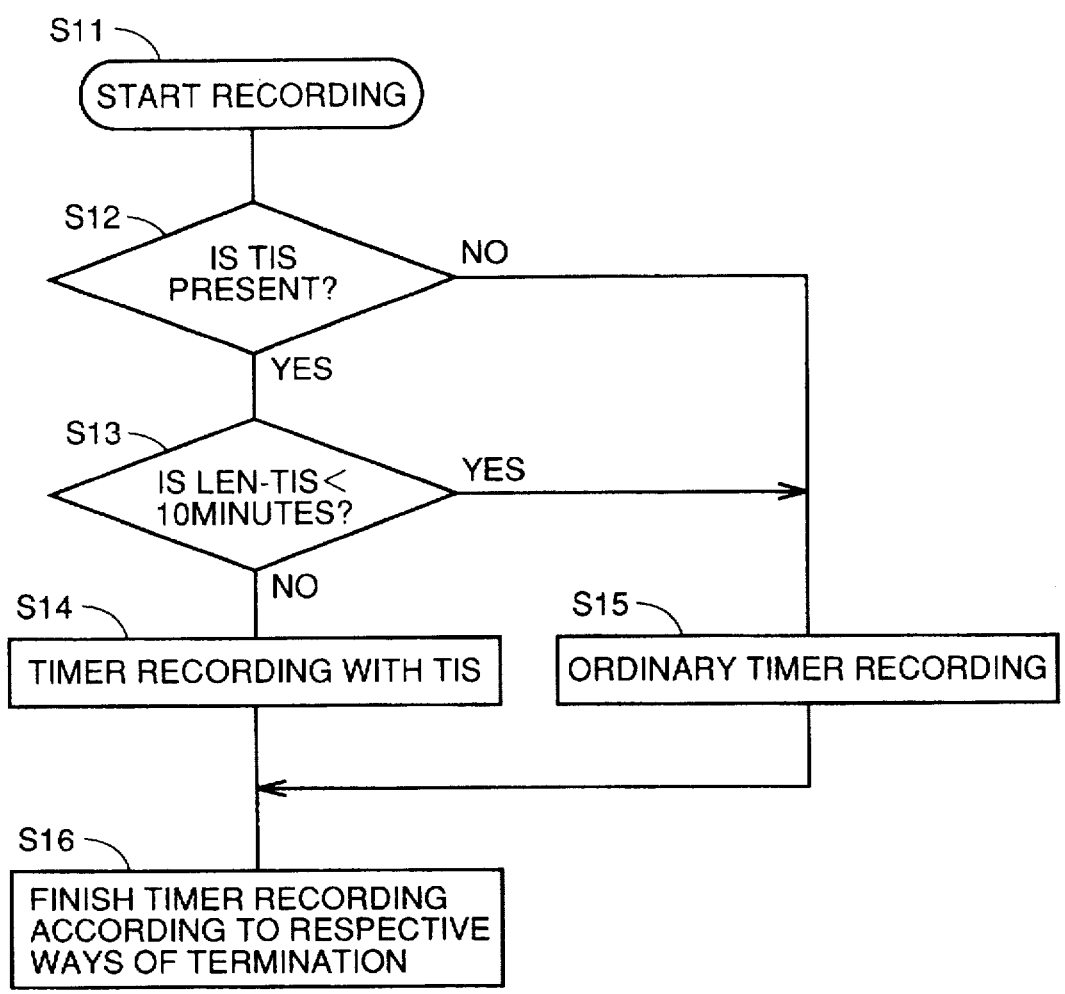
FIG. 5 is a flow chart for an automatic recording operation according to the second embodiment of the present invention.

In addition, if LEN-TIS is determined to be not less than ten minutes in step S13 of FIG. 5 (that is, between time T1 and time T2 in FIG. 4), it is determined that the recording is not intended for program B (in other words, determined that the user intended to record program A), and after the timer recording by the value of TIS is performed (S14), the recording is terminated in accordance with the related recording mode (S16).

When a reserved recording is initiated at a time between time T2 and time T3 in the second embodiment, an ordinary timer recording, that is, a timer recording without the control by TIS, is performed. In such a case, there is a disadvantage that when the broadcast time of program B is extended without notice, recording of program B is not performed automatically for the extra broadcast time. The third embodiment described in the following would deal with such disadvantage also.

Figure 6:
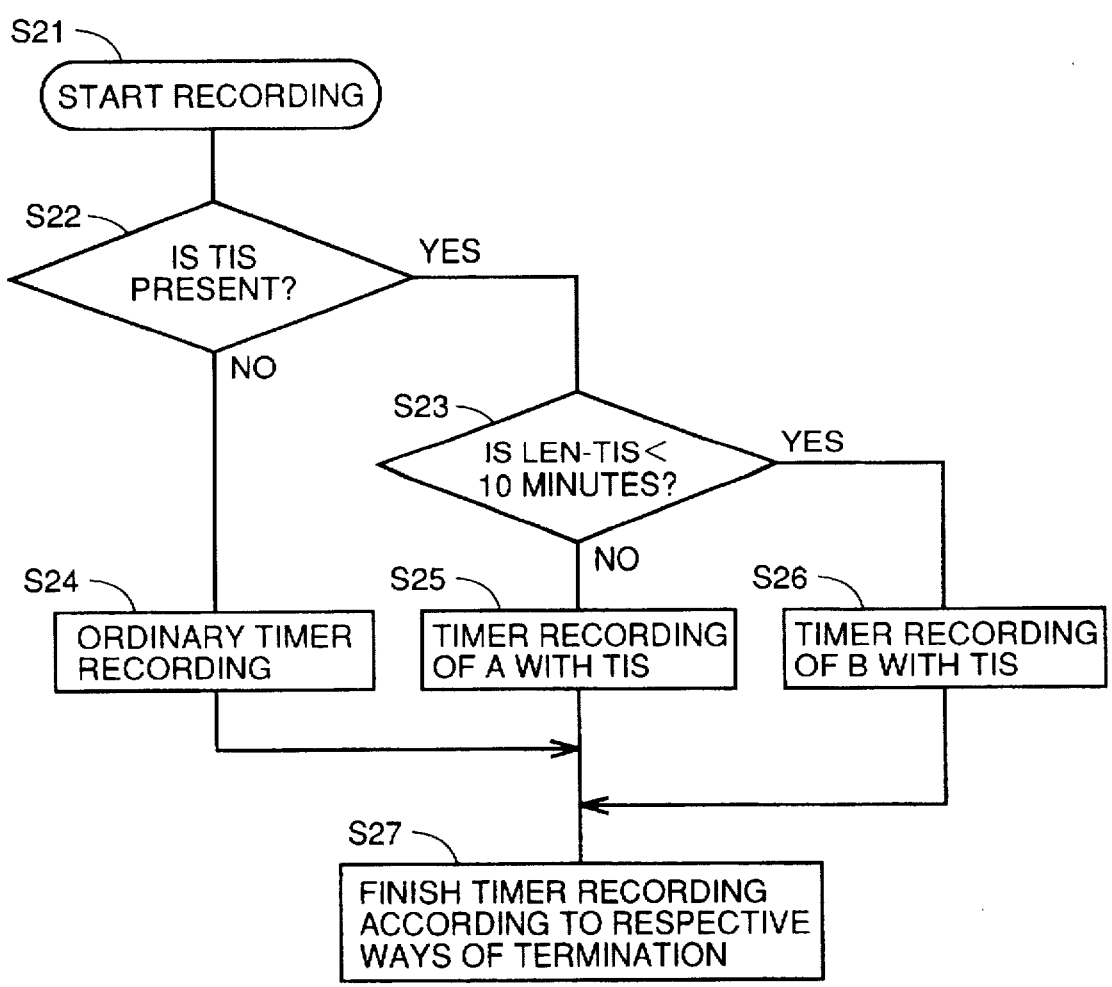
FIG. 6 is a flow chart for an automatic recording operation according to the third embodiment of the present invention.

The third embodiment will be described with reference to the time chart of FIG. 4 and steps S21 to S27 in the flow chart of FIG. 6. When the recording is started (S21), microcomputer 4 determines if there is TIS in the television signal (S22). When there is no TIS (NO at S22), an ordinary timer recording is performed (S24), and thereafter, the recording is terminated in accordance with this ordinary timer recording (S27).

When TIS is present (YES at S22), subtraction between program broadcast time length (i.e., the value of LEN) and elapsed broadcast time (i.e., the value of TIS) is performed so as to obtain the time left for the broadcasting (S23), and if the value resulted from this subtraction (the time left for broadcasting) is not less than ten minutes (between time T2 and time T3) (NO at S23), a timer recording of program A employing TIS is performed.

This timer recording of program A is carried on in an operation mode in which detection of program termination by TIS described with respect to the first embodiment is utilized, that is, a video recording mode in which detection is made on whether there has been a reduction in the value of TIS once. In such recording mode, when the recording is started at 9:05 in FIG. 4, for example, termination of recording would be effected at T3 which is the time when program A is finished (S27).

In addition, if the value obtained by the subtraction mentioned above (the time left for broadcasting) is within ten minutes (between time T2 and time T3) (YES at S23), timer recording of program B employing TIS is performed (S26). This timer recording of program B is performed in an operation mode using program termination detection by TIS described in relation with the first embodiment, that is, a video recording mode in which detection is made on whether there has been reduction in the value of TIS twice. In such recording mode, when recording is started at 9:55 in FIG. 4, for example, reduction in the value of TIS is detected for the first time at time T3 when program A is finished, and is detected for the second time at time T4 when the next program B is finished. The recording is terminated upon this second detection of reduction in TIS value (S27). Accordingly, even when broadcast time of program B is extended without notifying in advance, the recording is continued owing to the control by TIS such that video recording which can accommodate such extension of the program is possible.

Since the circuit blocks of the VTRs in the above-described second and third embodiments are similar to those of the first embodiment, description thereof will not be given here.

Although the present invention has been described and illustrated in detail, it is clearly understood that the same is by way of illustration and example only and is to be taken by way of limitation, the spirit and scope of the present invention being limited only by the terms of the appended claims.

What is claimed is:

1. A video recording control device for a video recording apparatus for comparing current and previous values indicated by an elapsed broadcast time information of a program in an EDS (Extended Data Service) signal superimposed on a television signal during its vertical blanking period to control the recording operation of said video recording apparatus utilizing said television signal according to the result of comparison.

2. The video recording control device according to claim 1, comprising:

EDS extracting means for extracting said EDS signal from said television signal;

decoding means for decoding said elapsed broadcast time information in said EDS signal extracted by said EDS extracting means;

comparing means for comparing current and previous values indicated by said elapsed broadcast time information decoded by said decoding means; and control means for controlling continuation and termination of said recording operation according to the result of comparison by said comparing means.

3. The video recording control device according to claim 2, wherein said decoding means decodes broadcast time length information of said program in said EDS signal extracted by said EDS extracting means, said video recording control device further comprising:

left time calculating means for subtracting said current value indicated by said elapsed broadcast time information decoded by said decoding means from a value indicated by said broadcast time length information decoded by said decoding means to calculate the time left for broadcasting of said program;

determination means for determining whether the value of said time left for broadcasting calculated by said left time calculating means is smaller than a predetermined value; and first recording control means for controlling said recording operation when said determination means determines that said value of said time left for broadcasting is smaller than the predetermined value and starting time for said recording operation is set to be within said time left for broadcasting, such that said recording operation is terminated upon expiration of a prescribed time period after said starting time.

4. The video recording control device according to claim 3, further comprising:

second recording control means for controlling said recording operation when said determination means determines that said value of said time left for broadcasting is smaller than the predetermined value and said starting time for said recording operation is set to be within said time left for broadcasting, such that said recording operation performed since said starting time is either continued or terminated according to the result of comparison by said comparing means.

5. A video recording control device for a video recording apparatus, comprising:

EDS extracting means for extracting an EDS (Extended Data Service) signal superimposed on a television signal during its vertical blanking period from said television signal;

decoding means for decoding elapsed broadcast time information of a program and broadcast time length of said program in said EDS signal extracted by said EDS extracting means;

left time calculating means for subtracting a current value indicated by said elapsed broadcast time information decoded by said decoding means from a value of said broadcast time length information decoded by said decoding means to calculated the time left for broadcasting said program;

determination means for determining whether the value of said time left for broadcasting calculated by said left time calculating means is smaller than a predetermined value; and recording control means for controlling a recording operation when said determination means determines that the value of said time left for broadcasting is smaller than the predetermined value and the starting time of the recording operation is set to be within said time left for broadcasting, such that said recording operation is terminated upon expiration of a prescribed time period after said starting time.

6. A video recording control device for a video recording apparatus, comprising:

EDS extracting means for extracting an EDS (Extended Data Service) signal superimposed on a television signal during its vertical blanking period from said television signal;

decoding means for decoding elapsed broadcast time information of a program and broadcast time length information of said program in said EDS signal extracted by said EDS extracting means;

comparing means for comparing current and previous values of said elapsed broadcast time information decoded by said decoding means;

left time calculating means for subtracting the current value of said elapsed broadcast time information decoded by said decoding means from a value of said broadcast time length information decoded by said decoding means to calculate the time left for broadcasting said program;

determination means for determining whether the value of said time left for broadcasting calculated by said left time calculating means is smaller than a predetermined value; and recording control means for controlling a recording operation when said determination means determines that said value of said time left for broadcasting is smaller than the predetermined value and starting time for said recording operation is set to be within said time left for broadcasting, such that said recording operation performed since said starting time is either continued or terminated according to the result of comparison by said comparing means.

7. The video recording control device according to claim 1, characterized in that said video recording apparatus is a video tape recorder.

8. The video recording control device according to claim 2, characterized in that said decoding means, said comparing means and said control means are constructed by using a program of a microcomputer.

9. The video recording control device according to claim 5, characterized in that said decoding means, said comparing means, said left time calculating means, said determination means and said recording control means are constructed by using a program of a microcomputer.

* * * * *